US012615256B1

(12) United States Patent
Natarajan et al.

(10) Patent No.: US 12,615,256 B1
(45) Date of Patent: Apr. 28, 2026

(54) SYSTEM AND METHOD OF VIEW DRIVEN OMNI-CART

(71) Applicant: Blue Yonder Group, Inc., Scottsdale, AZ (US)

(72) Inventors: Balaji Natarajan, Shrewsbury, MA (US); Raghuveer Prasad Nagar, Kota (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 87 days.

(21) Appl. No.: 18/224,914

(22) Filed: Jul. 21, 2023

Related U.S. Application Data

(60) Provisional application No. 63/425,785, filed on Nov. 16, 2022.

(51) Int. Cl.
H04L 9/40 (2022.01)
H04L 67/104 (2022.01)

(52) U.S. Cl.
CPC ............ H04L 63/10 (2013.01); H04L 67/104 (2013.01)

(58) Field of Classification Search
CPC ............................. H04L 63/10; H04L 67/104
See application file for complete search history.

(56) References Cited

U.S. PATENT DOCUMENTS

| | | | |
|---|---|---|---|
| 9,607,330 | B2 | 3/2017 | Spitz et al. |
| 10,275,332 | B2 | 4/2019 | Ryabchun et al. |

| | | | | |
|---|---|---|---|---|
| 10,529,336 | B1 * | 1/2020 | Matthews | ............. H04M 1/271 |
| 11,138,611 | B2 * | 10/2021 | Sivan | ................. G06Q 30/0603 |
| 11,706,337 | B1 * | 7/2023 | Mitchem | ................. G06F 40/30 |
| | | | | 704/270.1 |
| 2009/0182643 | A1 * | 7/2009 | Holstein | ................ G06Q 40/12 |
| | | | | 705/26.1 |
| 2018/0081927 | A1 * | 3/2018 | Soryal | ..................... H04L 67/56 |

(Continued)

FOREIGN PATENT DOCUMENTS

JP            6019124         11/2016

OTHER PUBLICATIONS

IBM Documentation, "Pull cart," Apr. 16, 2021, IBM Sterling Call Center 9.5.0 Documentation, https://www.ibm.com/docs/en/call-center/9.5.0?topic=orders-pull-cart, (Year: 2021).

(Continued)

*Primary Examiner* — Oleg Survillo
(74) *Attorney, Agent, or Firm* — Spencer Fane LLP; Steven J. Laureanti

(57)            ABSTRACT

A system and method are disclosed for sharing cart data. The method includes detecting a request to share cart data between a primary device and a non-primary device, retrieving cart data from the primary device based at least in part on a sharing method, filtering private user data from the cart data, displaying the filtered cart data on the non-primary device, and updating the cart data based on communications between the primary device and the non-primary device. The method further comprises monitoring non-text communications between the primary device and the non-primary device, converting the non-text communications into text in order to perform text classification, generating temporary access credentials to allow access to the cart data by the non-primary device, and purging the temporary access credentials upon ending sharing of the cart data.

20 Claims, 5 Drawing Sheets

(56)  References Cited

U.S. PATENT DOCUMENTS

2021/0027349 A1* 1/2021 Spitz .................. G06Q 30/0613
2021/0110451 A1* 4/2021 Marchant ........... G06Q 30/0633
2022/0366477 A1* 11/2022 Gupta ............... G06Q 30/0629
2024/0028695 A1* 1/2024 Chen .................. G06F 3/04847

OTHER PUBLICATIONS

"Share-A-Cart," The Wayback Machine, Apr. 21, 2021, https://web.
archive.org/web/20210421073921/https://share-a-cart.com/, (Year:
2021).
"Cart Sharing," CS-Cart Addons Documentation, https://docs.cs-
cart.com/marketplace-addons/addons/cart_sharing/index.
html#overview, (Year: 2018).
Keenan, Joe, "Shared Cart Functionality Essential to Omnichannel
Customer Experience," Total Retail, https://www.mytotalretail.com/
article/shared-cart-functionality-essential-to-omnichannel-customer-
experience/, (Year: 2019).

* cited by examiner

300

302 — DETECT REQUEST TO SHARE CART DATA BETWEEN DEVICES

304 — RETRIEVE CART DATA BASED ON A SHARING METHOD

306 — FILTER PRIVATE USER DATA FROM CART DATA

308 — DISPLAY FILTERED CART DATA

310 — ALLOW UPDATING OF CART BY NON-PRIMARY USER

END

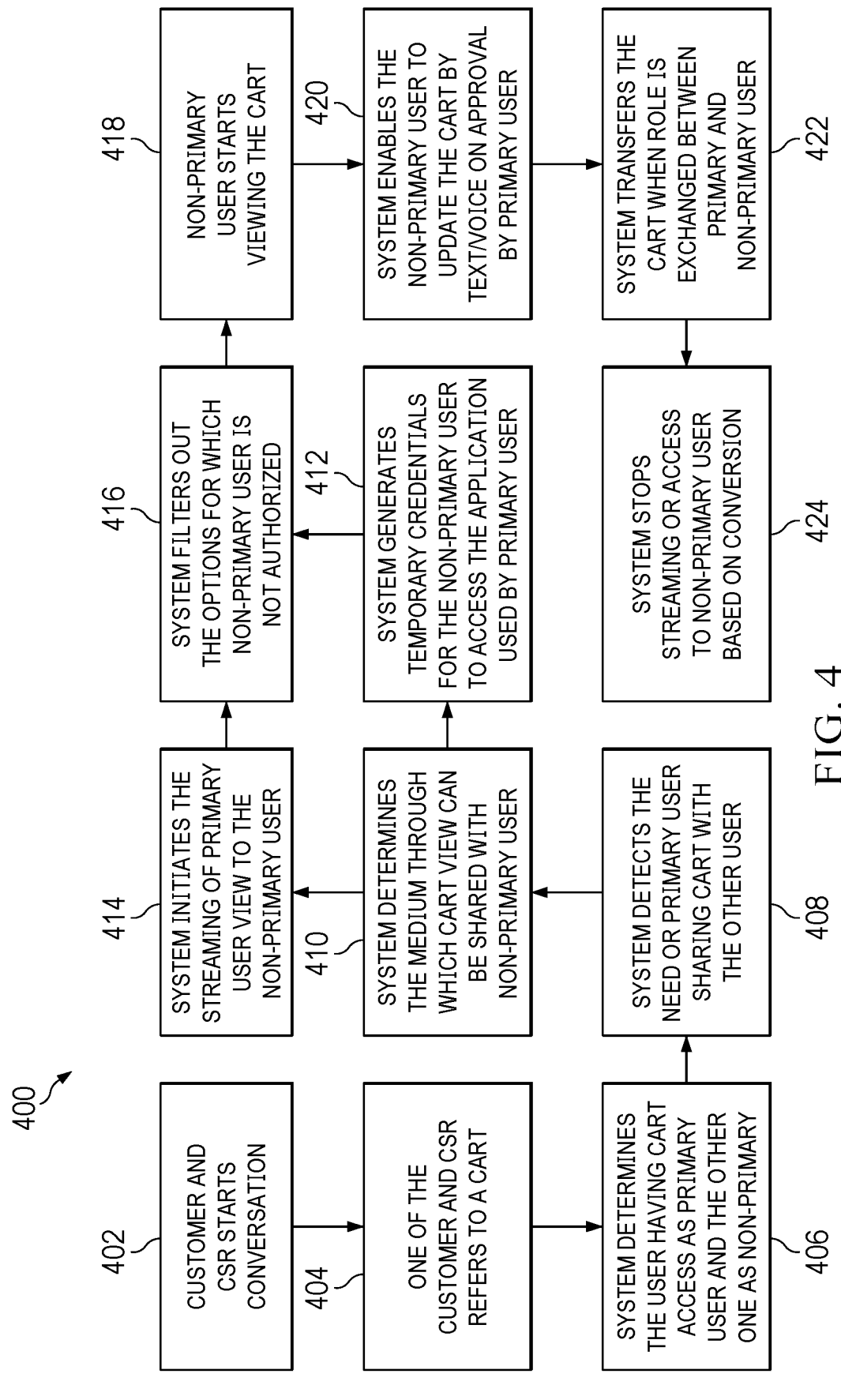

400

402 — CUSTOMER AND CSR STARTS CONVERSATION

404 — ONE OF THE CUSTOMER AND CSR REFERS TO A CART

406 — SYSTEM DETERMINES THE USER HAVING CART ACCESS AS PRIMARY USER AND THE OTHER ONE AS NON-PRIMARY

408 — SYSTEM DETECTS THE NEED OR PRIMARY USER SHARING CART WITH THE OTHER USER

410 — SYSTEM DETERMINES THE MEDIUM THROUGH WHICH CART VIEW CAN BE SHARED WITH NON-PRIMARY USER

412 — SYSTEM GENERATES TEMPORARY CREDENTIALS FOR THE NON-PRIMARY USER TO ACCESS THE APPLICATION USED BY PRIMARY USER

414 — SYSTEM INITIATES THE STREAMING OF PRIMARY USER VIEW TO THE NON-PRIMARY USER

416 — SYSTEM FILTERS OUT THE OPTIONS FOR WHICH NON-PRIMARY USER IS NOT AUTHORIZED

418 — NON-PRIMARY USER STARTS VIEWING THE CART

420 — SYSTEM ENABLES THE NON-PRIMARY USER TO UPDATE THE CART BY TEXT/VOICE ON APPROVAL BY PRIMARY USER

422 — SYSTEM TRANSFERS THE CART WHEN ROLE IS EXCHANGED BETWEEN PRIMARY AND NON-PRIMARY USER

424 — SYSTEM STOPS STREAMING OR ACCESS TO NON-PRIMARY USER BASED ON CONVERSION

FIG. 4

SYSTEM AND METHOD OF VIEW DRIVEN OMNI-CART

CROSS-REFERENCE TO RELATED APPLICATIONS

The present disclosure is related to that disclosed in the U.S. Provisional Application No. 63/425,785, filed Nov. 16, 2022, entitled "View Driven Omni-Cart." U.S. Provisional Application No. 63/425,785 is assigned to the assignee of the present application. The present invention hereby claims priority under 35 U.S.C. § 119(e) to U.S. Provisional Application No. 63/425,785.

TECHNICAL FIELD

The present disclosure relates generally to customer service platforms and specifically to sharing cart data over customer service platforms.

BACKGROUND

E-commerce retailers commonly rely on customer service platforms to facilitate communication between the retailers and customers. Customer service platforms may implement an omni-cart, which enables a customer service representative to modify an online shopping cart of a customer to resolve various issues corresponding to the cart. Existing omni-cart implementations transfer the cart from the e-commerce channel to the customer service channel for the customer service representative to modify the cart, then transfer the cart back to the e-commerce channel. However, transferring the cart typically requires transforming the cart data to match the specifications of the different channels, which involves substantial network traffic. Further, transferring the cart from the e-commerce channel to the customer service channel to modify the cart takes time and prevents the customer from viewing the modifications as they are happening, which may result in low cart-to-order conversion ratios. Due to this substantial network traffic and low cart-to-order conversion ratios, existing omni-cart implementations result in higher costs of operating customer service platforms, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 4 illustrates a second example method for sharing cart data between two devices, in accordance with an embodiment.

DETAILED DESCRIPTION

Figure 1:
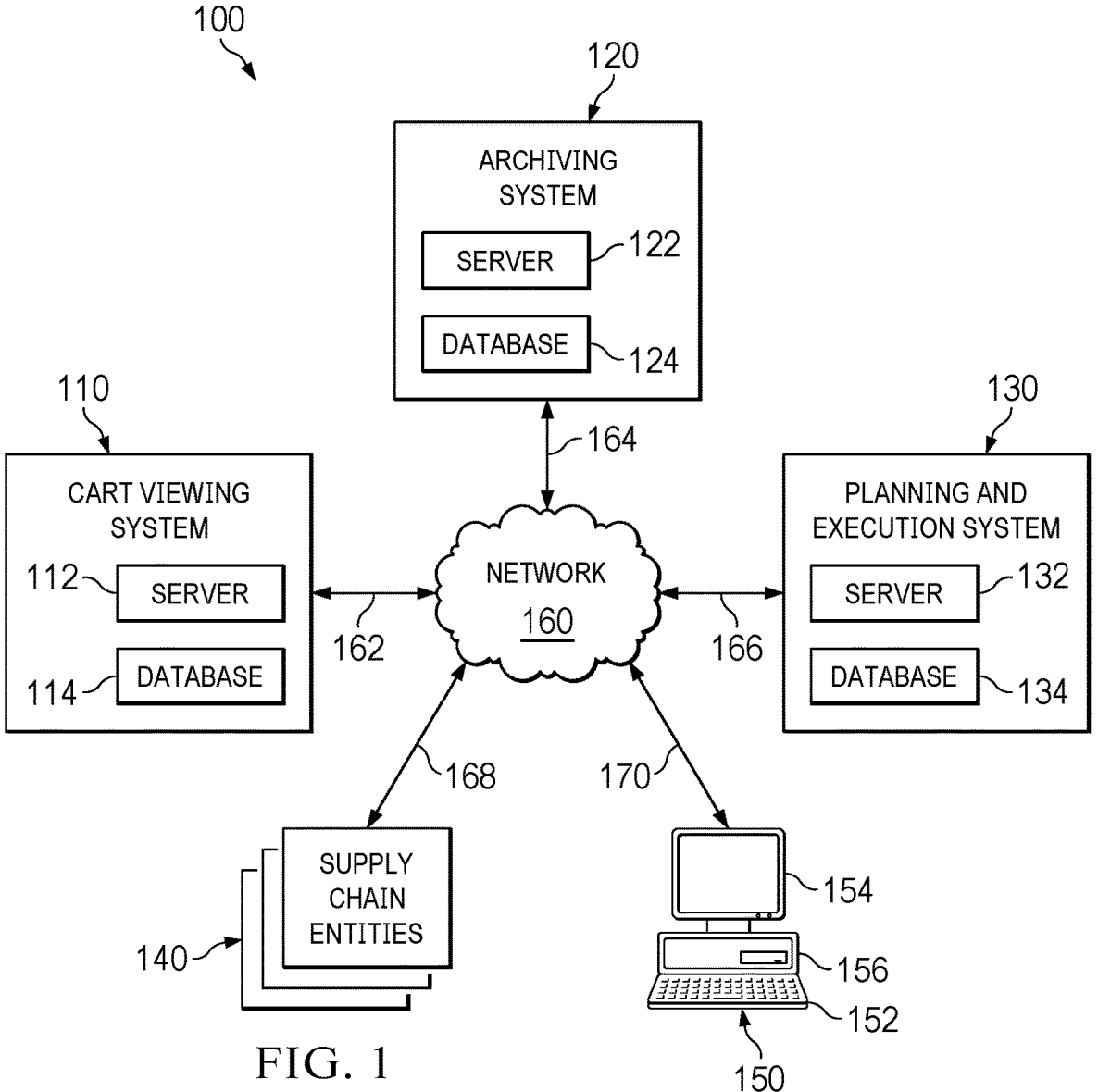
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide a system and method for sharing the view of an online shopping cart that a primary user of the cart has with a non-primary user of the cart while the primary user is editing the cart. Embodiments may monitor communications between the primary user and the non-primary user over multiple channels of communication to identify the need to share the cart. Embodiments may stream the view directly from one compatible device to another or may generate a temporary credential to enable access to the view. Embodiments enable the nonprimary user to update the cart of the primary user by text, voice, or directly operating on the cart. Embodiments may also filter sensitive or private data of the primary user from being shown to the non-primary user.

Embodiments of the following disclosure enable customer service representatives (CSRs) to update an online shopping cart without transforming the carts to meet the specifications of different channels of an e-commerce channel and a customer service platform. Embodiments allow CSRs to modify the carts based on the shared view without transferring the cart back and forth between the CSR and the customer. The use of embodiments may significantly reduce the amount of time that CSRs spend per customer and the operation cost of a CSR center. Further, the use of embodiments may decrease network traffic when editing the carts.

FIG. 1 illustrates supply chain network 100, in accordance with a first embodiment. Supply chain network 100 comprises cart viewing system 110, archiving system 120, planning and execution system 130, one or more supply chain entities 140, one or more computers 150, network 160, and one or more communication links 162-170. Although a single cart viewing system 110, a single archiving system 120, a single planning and execution system 130, one or more supply chain entities 140, one or more computers 150, a single network 160, and one or more communication links 162-170 are shown and described, embodiments contemplate any number of cart viewing systems, archiving systems, planning and execution systems, supply chain entities, computers, networks, or communication links, according to particular needs.

In one embodiment, cart viewing system 110 comprises server 112 and database 114. In embodiments, cart viewing system 110 may be connected to one or more CSR systems, such as, for example, a group of CSR systems grouped together in a call center or similar grouping. The CSR systems may be used to offer a customer service platform to one or more user devices, over one or more communication channels, such as email, phone, chat, and the like. Cart viewing system 110 may, in an embodiment, utilize one or more software modules of server 112 to monitor communications between the CSR systems and the user devices to determine whether to share cart information between one of the CSR systems and one of the user devices. Cart viewing system 110 may then perform one or more filtering steps to preserve the privacy of user data 220 (FIG. 2) before sharing cart information between the CSR system and the user device.

Archiving system 120 comprises server 122 and database 124. Although archiving system 120 is shown as comprising a single server 122 and a single database 124, embodiments contemplate any suitable number of servers or databases internal to or externally coupled with archiving system 120. Server 122 of archiving system 120 may support one or more processes for receiving and storing data from planning and execution system 130 and/or one or more computers 150 of supply chain network 100. According to some embodiments, archiving system 120 comprises an archive of data received from planning and execution system 130 and/or one or more computers 150 of supply chain network 100. Archiving system 120 provides archived data to cart viewing system 110 and/or planning and execution system 130. Server 122 may store the received data in database 124. Database 124 of archiving system 120 may comprise one or more databases or other data storage arrangements at one or more locations, local to, or remote from, server 122.

According to an embodiment, planning and execution system 130 comprises server 132 and database 134. Supply chain planning and execution is typically performed by several distinct and dissimilar processes, including, for example, assortment planning, demand planning, operations planning, production planning, supply planning, distribution planning, execution, pricing, forecasting, transportation management, warehouse management, inventory management, fulfillment, procurement, and the like. Server 132 of planning and execution system 130 comprises one or more modules, such as, for example, a sourcing module, a scheduling module, and/or a pick-pack-ship module for performing one or more order fulfillment processes. Server 132 stores and retrieves data from database 134 or one or more locations in supply chain network 100. In addition, planning and execution system 130 operates on one or more computers 150 that are integral to or separate from the hardware and/or software that support archiving system 120 and cart viewing system 110.

One or more supply chain entities 140 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Although one example of supply chain network 100 is illustrated and described, embodiments contemplate any configuration of supply chain network 100, without departing from the scope described herein.

As shown in FIG. 1, supply chain network 100 comprising cart viewing system 110, archiving system 120, planning and execution system 130, and one or more supply chain entities 140 may operate on one or more computers 150 that are integral to or separate from the hardware and/or software that support cart viewing system 110, archiving system 120, planning and execution system 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer-readable medium, magnetic computer disks, flash drives, CD-ROM, in-memory device, or other suitable media to receive output from and provide input to supply chain network 100.

One or more computers 150 may include one or more processors 156 and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field-programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from cart viewing system 110, archiving system 120, planning and execution system 130, and one or more supply chain entities 140. In addition, each of one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with cart viewing system 110 and archiving system 120.

In one embodiment, cart viewing system 110 may be coupled with network 160 using communication link 162, which may be any wireline, wireless, or other link suitable to support data communications between cart viewing system 110 and network 160 during operation of supply chain network 100. Archiving system 120 may be coupled with network 160 using communication link 164, which may be any wireline, wireless, or other link suitable to support data communications between archiving system 120 and network 160 during operation of supply chain network 100. Planning and execution system 130 may be coupled with network 160 using communication link 166, which may be any wireline, wireless, or other link suitable to support data communications between planning and execution system 130 and network 160 during operation of supply chain network 100. One or more supply chain entities 140 may be coupled with network 160 using communication link 168, which may be any wireline, wireless, or other link suitable to support data communications between one or more supply chain entities 140 and network 160 during operation of supply chain network 100. One or more computers 150 may be coupled with network 160 using communication link 170, which may be any wireline, wireless, or other link suitable to support data communications between one or more computers 150 and network 160 during operation of supply chain network 100. Although communication links 162-170 are shown as generally coupling cart viewing system 110, archiving system 120, planning and execution system 130, one or more supply chain entities 140, and one or more computers 150 to network 160, any of cart viewing system 110, archiving system 120, planning and execution system 130, one or more supply chain entities 140, and one or more computers 150 may communicate directly with each other, according to particular needs.

In another embodiment, network 160 includes the Internet and any appropriate local area networks (LANs), metropolitan area networks (MANs), or wide area networks (WANs) coupling cart viewing system 110, archiving system 120, planning and execution system 130, one or more supply chain entities 140, and one or more computers 150. For example, data may be maintained locally to, or externally of, cart viewing system 110, archiving system 120, planning and execution system 130, one or more supply chain entities 140, and one or more computers 150 and made available to one or more associated users of cart viewing system 110, archiving system 120, planning and execution system 130, one or more supply chain entities 140, and one or more computers 150 using network 160 or in any other appropriate manner. For example, data may be maintained in a cloud database at one or more locations external to cart viewing system 110, archiving system 120, planning and execution system 130, one or more supply chain entities 140, and one or more computers 150 and made available to one or more associated users of cart viewing system 110, archiving system 120, planning and execution system 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Figure 2:
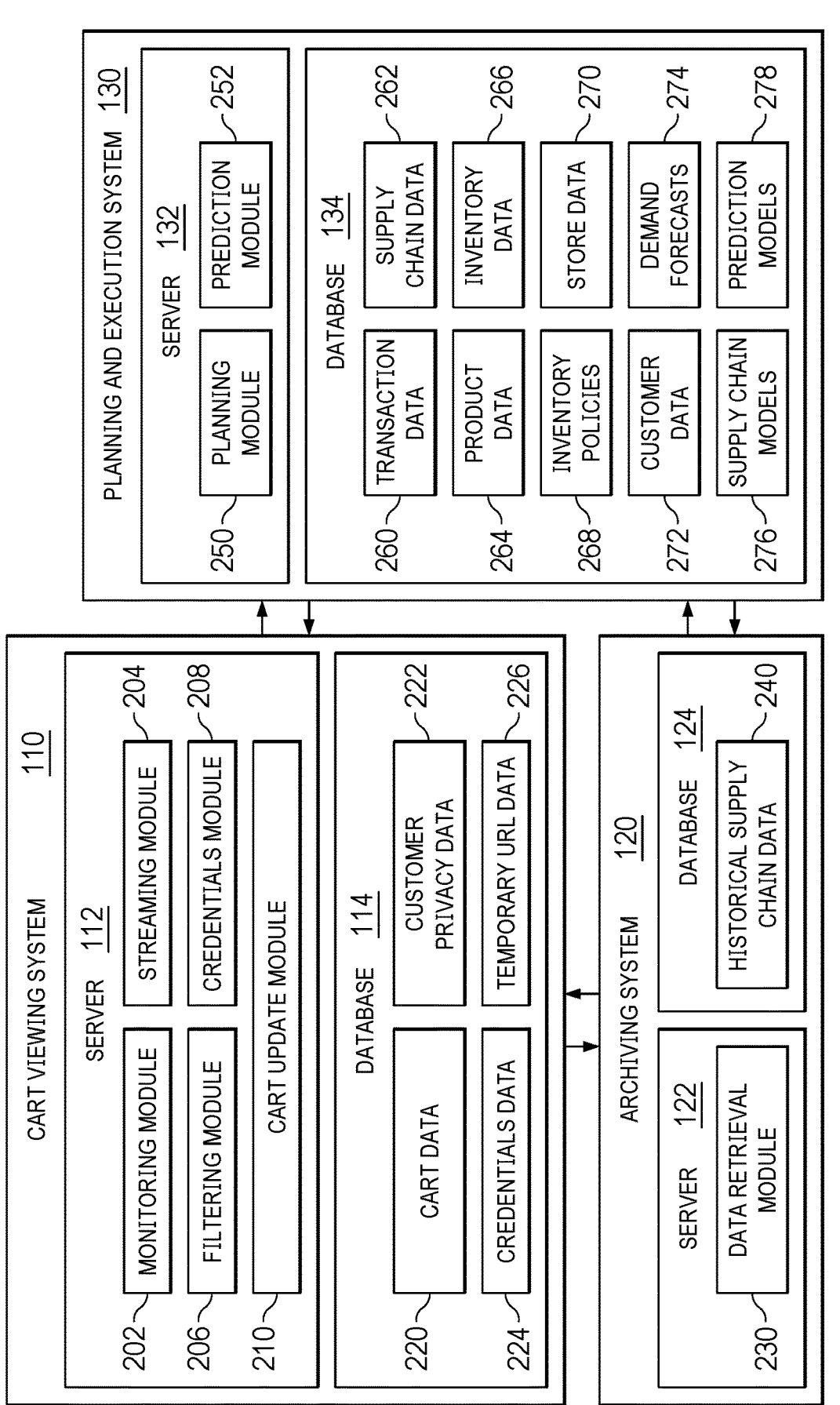
FIG. 2 illustrates the cart viewing system, the archiving system, and the planning and execution system of FIG. 1 in greater detail, in accordance with an embodiment.

FIG. 2 illustrates cart viewing system 110, archiving system 120, and planning and execution system 130 of FIG. 1 in greater detail, in accordance with an embodiment. Cart viewing system 110 may comprise server 112 and database 114, as described above. Although cart viewing system 110 is shown as comprising a single server 112 and a single database 114, embodiments contemplate any suitable number of servers or databases internal to or externally coupled with cart viewing system 110.

Server 112 of cart viewing system 110 comprises monitoring module 202, streaming module 204, filtering module 206, credentials module 208, and cart update module 210. Although server 112 is shown and described as comprising a single monitoring module 202, a single streaming module 204, a single filtering module 206, a single credentials module 208, and a single cart update module 210, embodiments contemplate any suitable number or combination of these located at one or more locations, local to, or remote from, cart viewing system 110, such as on multiple servers or computers 150 at one or more locations in supply chain network 100.

Database 114 of cart viewing system 110 may comprise one or more databases or other data storage arrangements at one or more locations, local to, or remote from, server 112. Database 114 of cart viewing system 110 comprises, for example, cart data 220, customer privacy data 222, credentials data 224, and temporary URL data 226. Although database 114 of cart viewing system 110 is shown and described as comprising cart data 220, customer privacy data 222, credentials data 224, and temporary URL data 226, embodiments contemplate any suitable number or combination of data, located at one or more locations, local to, or remote from, cart viewing system 110, according to particular needs.

Monitoring module 202 monitors communications between a user device and a CSR device to determine whether a request or desire to share cart data 220 between the user device and the CSR device has occurred. The communications may be over one or more channels, such as email, chat messages, a phone conversation, and the like. Monitoring module 202 may detect the request using any text classification technique, such as, for example, a support vector machine (SVM). Monitoring module 202 may also determine in which direction to share the cart information between the user device and the CSR device by analyzing the communications. For example, monitoring module 202 may determine, upon a request from the user device for help with a problem in a cart, to share cart data 220 from the user device to the CSR device. Monitoring module 202 may further detect that sharing cart data 220 is no longer required by using text classification techniques on the communications and stops the sharing of cart data 220 accordingly.

According to embodiments, streaming module 204 retrieves cart data 220 from the user device or the CSR device, and shares cart data 220 to the other of the devices. The device to be shared from may be referred to as the primary device, while the device to be shared to may be referred to as the non-primary device. Streaming module 204 may identify the display device associated with the primary device, such as, for example, a laptop screen, an augmented reality (AR) glass, a tablet, or any other suitable display device. Streaming module 204 also determines a display device associated with the non-primary device. When possible, streaming module 204 may display cart data 220 on the non-primary device using a matching display stream from the primary device. For example, when the primary device is using an AR glass as the display device and the non-primary device is also enabled with an AR glass, streaming module 204 may share cart data 220 by replicating the view from the primary device AR glass to the non-primary device AR glass.

Filtering module 206 detects private user information within cart data 220 and filters out this information before cart data 220 is shared to the non-primary device. In some embodiments, a user may configure which data may and may not be shared as cart data 220. For example, the user may select portions of a display screen of the user device to share or may select portions of the display screen not to be displayed while sharing the rest of the display screen. In other embodiments, filtering module 206 may determine portions of a shared application that may include private user information and filter out such portions. For example, when a left-hand panel of a particular cart screen is associated with user searches, filtering module 206 may omit the left-hand panel while sharing the rest of the cart screen with the non-primary device.

According to embodiments, credentials module 208 generates temporary access credentials and a temporary URL for the non-primary device to access the cart of the primary device. For example, when the display devices used by the primary device and the non-primary device are not compatible, streaming the view using streaming module 204 may not be possible. In such examples, credentials module 208 may generate the temporary access credentials and the temporary URL in order for the non-primary device to temporarily gain access to the primary device to update the cart as needed.

Cart update module 210 detects a command to update the cart from the non-primary device and transmits this update to the primary device. Cart update module 210 may monitor communications for a grant of permission to update, by the primary device to the non-primary device, using text classification techniques such as Naïve Bayes. In some embodiments, cart update module 210 may update the cart based on the text and/or voice commands issued by a user associated with the non-primary device. In other embodiments, cart update module 210 may transfer the cart from the primary user to the non-primary user, enabling the non-primary user to operate directly on the cart.

Cart data 220 comprises data of a cart associated with the primary device. In some embodiments, cart data 220 may comprise a video feed of a screen displayed on the primary device, which may be streamed to the non-primary device. In other embodiments, cart data 220 may comprise display data for use in displaying the cart on an AR glass or other AR display device. According to embodiments, cart data 220 may be retrieved by streaming module 204 from the primary device and filtered to remove any private user data contained within cart data 220 by filtering module 206. Cart data 220 may thereafter be displayed, without the private user data, on the non-primary device.

Customer privacy data 222 comprises configurations to prevent the sharing of private user data with the non-primary device. Customer privacy data 222 may be associated with certain carts or applications and may enable the sharing of areas of a display screen that are not showing private data while preventing the sharing of other areas of the display screen that are showing private data. For example, certain sections of a display screen may be configured to never be shared with the non-primary device, such as, for example, sections showing order history, profile information, search information, or any part of the display showing unrelated parts of the primary device display. In other embodiments, customer privacy data 222 comprises selections by the user that determine which areas of the primary device display may be shared or streamed.

Credentials data 224 comprises temporary access credentials generated by credentials module 208 to allow access to the cart of the primary device by the non-primary device. For example, when no display devices between the primary device and the non-primary device are determined to be compatible, credentials module 208 may generate credentials data 224 and transmit credentials data 224 to the non-primary device. In other examples, credentials module 208 may detect a high-latency or otherwise unsuitable connection between the primary device and the non-primary device and generate credentials data 224 to prevent streaming data between the primary device and the non-primary device. According to embodiments, monitoring module 202 purges credentials data 224 upon ending the sharing of cart data 220.

Temporary URL data 226 comprises a link that may be used to access the cart of the primary device. Temporary URL data 226 may be generated by credentials module 208 and transmitted to the non-primary device when streaming cart data 220 is determined to be unsuitable.

As discussed above, archiving system 120 comprises server 122 and database 124. Although archiving system 120 is shown as comprising a single server 122 and a single database 124, embodiments contemplate any suitable number of servers or databases internal to or externally coupled with archiving system 120.

Server 122 of archiving system 120 comprises data retrieval module 230. Although server 122 is shown and described as comprising a single data retrieval module 230, embodiments contemplate any suitable number or combination of data retrieval modules located at one or more locations, local to, or remote from archiving system 120, such as on multiple servers or computers 150 at one or more locations in supply chain network 100.

In one embodiment, data retrieval module 230 of archiving system 120 receives historical supply chain data 240 from planning and execution system 130 and one or more supply chain entities 140, and stores received historical supply chain data 240 in archiving system 120 database 124. According to one embodiment, data retrieval module 230 of archiving system 120 may prepare historical supply chain data 240 for use as the training data of cart viewing system 110 by checking historical supply chain data 240 for errors and transforming historical supply chain data 240 to normalize, aggregate, and/or rescale historical supply chain data 240 to allow direct comparison of data received from different planning and execution systems 130, one or more supply chain entities 140, and/or one or more other locations local to, or remote from, archiving system 120. According to embodiments, data retrieval module 230 may receive data from one or more sources external to supply chain network 100, such as, for example, weather data, special events data, social media data, calendar data, and the like and stores the received data as historical supply chain data 240.

Database 124 of archiving system 120 may comprise one or more databases or other data storage arrangements at one or more locations, local to, or remote from, server 122. Database 124 of archiving system 120 comprises, for example, historical supply chain data 240. Although database 124 of archiving system 120 is shown and described as comprising historical supply chain data 240, embodiments contemplate any suitable number or combination of data, located at one or more locations, local to, or remote from, archiving system 120, according to particular needs.

Historical supply chain data 240 comprises historical data received from cart viewing system 110, archiving system 120, planning and execution system 130, one or more supply chain entities 140, and/or one or more computers 150. Historical supply chain data 240 may comprise, for example, weather data, special events data, social media data, calendar data, and the like. In an embodiment, historical supply chain data 240 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As discussed above, planning and execution system 130 comprises server 132 and database 134. Although planning and execution system 130 is shown as comprising a single server 132 and a single database 134, embodiments contemplate any suitable number of servers or databases internal to or externally coupled with planning and execution system 130.

Server 132 of planning and execution system 130 comprises planning module 250 and prediction module 252. Although server 132 is shown and described as comprising a single planning module 250 and a single prediction module 252, embodiments contemplate any suitable number or combination of planning modules and prediction modules located at one or more locations, local to, or remote from planning and execution system 130, such as on multiple servers or computers 150 at one or more locations in supply chain network 100.

Database 134 of planning and execution system 130 may comprise one or more databases or other data storage arrangements at one or more locations, local to, or remote from, server 132. Database 134 of planning and execution system 130 comprises, for example, transaction data 260, supply chain data 262, product data 264, inventory data 266, inventory policies 268, store data 270, customer data 272, demand forecasts 274, supply chain models 276, and prediction models 278. Although database 134 of planning and execution system 130 is shown and described as comprising transaction data 260, supply chain data 262, product data 264, inventory data 266, inventory policies 268, store data 270, customer data 272, demand forecasts 274, supply chain models 276, and prediction models 278, embodiments contemplate any suitable number or combination of data, located at one or more locations, local to, or remote from, planning and execution system 130, according to particular needs.

Planning module 250 of planning and execution system 130 works in connection with prediction module 252 to generate a plan based on one or more predicted retail volumes, classifications, or other predictions. By way of example and not of limitation, planning module 250 may comprise a demand planner that generates a demand forecast for one or more supply chain entities 140. Planning module 250 may generate the demand forecast, at least in part, from predictions and calculated factor values for one or more causal factors received from prediction module 252. By way of a further example, planning module 250 may comprise an assortment planner and/or a segmentation planner that generates product assortments that match causal effects calculated for one or more customers or products by prediction module 252, which may provide for increased customer satisfaction and sales, as well as reducing costs for shipping and stocking products at stores where they are unlikely to sell.

Prediction module 252 of planning and execution system 130 applies samples of transaction data 260, supply chain data 262, product data 264, inventory data 266, store data 270, customer data 272, demand forecasts 274, and other data to prediction models 278 to generate predictions and calculated factor values for one or more causal factors. As disclosed above, prediction module 252 of planning and execution system 130 predicts a volume Y (target) from a set of causal factors X along with causal factors strengths that describe the strength of each causal factor variable contributing to the predicted volume. According to some embodiments, prediction module 252 generates predictions at daily intervals. However, embodiments contemplate longer and shorter prediction phases that may be performed, for example, weekly, twice a week, twice a day, hourly, or the like.

Transaction data 260 of planning and execution system 130 database 134 may comprise recorded sales and returns transactions and related data, including, for example, a transaction identification, time and date stamp, channel identification (such as stores or online touchpoints), product identification, actual cost, selling price, sales volume, customer identification, orders, shipments, promotions, and/or the like. In addition, transaction data 260 is represented by any suitable combination of values and dimensions, aggregated or un-aggregated, such as, for example, sales per week, sales per week per location, sales per day, sales per day per season, or the like.

Supply chain data 262 may comprise any data of the one or more supply chain entities 140 including, for example, item data, identifiers, metadata (comprising dimensions, hierarchies, levels, members, attributes, cluster information, and member attribute values), fact data (comprising measure values for combinations of members), business constraints, goals, and objectives of one or more supply chain entities 140.

Product data 264 of database 134 may comprise products identified by, for example, a product identifier (such as a Stock Keeping Unit (SKU), Universal Product Code (UPC) or the like), and one or more attributes and attribute types associated with the product ID. Product data 264 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 266 of database 134 may comprise any data relating to current or projected inventory quantities or states, order rules, or the like. For example, inventory data 266 may comprise the current level of inventory for each item at one or more stocking points across supply chain network 100. In addition, inventory data 266 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 266 in database 134, which may be used by planning and execution system 130 to place orders, set inventory levels at one or more stocking points, initiate manufacturing of one or more components, or the like in response to, and based at least in part on, a forecasted demand of planning and execution system 130.

Inventory policies 268 of database 134 may comprise any suitable inventory policy describing the reorder point and target quantity, or other inventory policy parameters that set rules for cart viewing system 110 and/or planning and execution system 130 to manage and reorder inventory. Inventory policies 268 may be based on target service level, demand, cost, fill rate, or the like. According to embodiments, inventory policies 268 comprise target service levels that ensure that a service level of one or more supply chain entities 140 is met with a set probability. For example, one or more supply chain entities 140 may set a service level at 95%, meaning one or more supply chain entities 140 sets the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, cart viewing system 110 and/or planning and execution system 130 may determine a replenishment order according to one or more replenishment rules, which, among other things, indicates to one or more supply chain entities 140 to determine or receive inventory to replace the depleted inventory. By way of example only and not by way of limitation, an inventory policy for non-perishable goods with linear holding and shorting costs comprises a min./max. (s,S) inventory policy. Other inventory policies may be used for perishable goods, such as fruit, vegetables, dairy, fresh meat, as well as electronics, fashion, and similar items for which demand drops significantly after a next generation of electronic devices or a new season of fashion is released.

Store data 270 may comprise data describing the stores of one or more retailers and related store information. Store data 270 may comprise, for example, a store ID, store description, store location details, store location climate, store type, store opening date, lifestyle, store area (expressed in, for example, square feet, square meters, or other suitable measurement), latitude, longitude, and other similar data.

Customer data 272 may comprise customer identity information, including, for example, customer relationship management data, loyalty programs, and mappings between product purchases and one or more customers so that a customer associated with a transaction may be identified. Customer data 272 may comprise data relating customer purchases to one or more products, geographical regions, store locations, or other types of dimensions.

Demand forecasts 274 of database 134 may indicate future expected demand based on, for example, any data relating to past sales, past demand, purchase data, promotions, events, or the like of one or more supply chain entities 140. Demand forecasts 274 may cover a time interval such as, for example, by the minute, hour, daily, weekly, monthly, quarterly, yearly, or any other suitable time interval, including substantially in real time. Demand may be modeled as a negative binomial or Poisson-Gamma distribution. According to other embodiments, the model also takes into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. When each location of this exemplary supermarket is open every day of the year, planning and execution system 130 comprising a demand planner needs to calculate approximately 2×10^10 demand forecasts 274 each day to derive the optimal order volume for the next delivery cycle (e.g., three days).

Supply chain models 276 of database 134 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 276 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model. Prediction models 278 comprise one or more of the trained models used by planning and execution system 130 for predicting, among other variables, pricing, targeting, or retail volume, such as, for example, a forecasted demand volume for one or more products at one or more stores of one or more retailers based on the prices of the one or more products.

Figure 3:
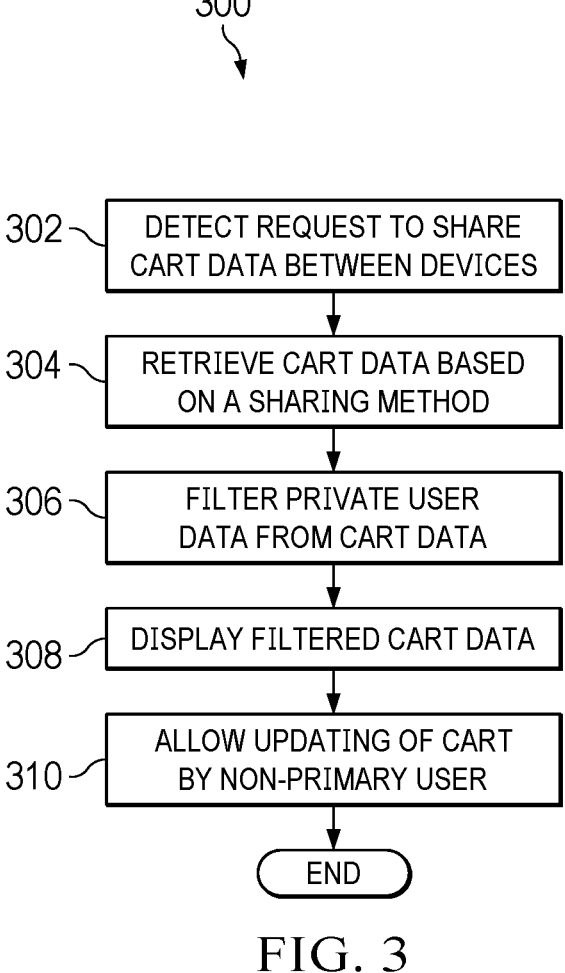
FIG. 3 illustrates a first example method for sharing cart data between two devices, in accordance with an embodiment.

FIG. 3 illustrates first example method 300 for sharing cart data 220 between two devices, in accordance with an embodiment. Method 300 may be performed by a cart viewing system, such as cart viewing system 110 of FIG. 1. Method 300 proceeds by one or more activities, which although described in a particular order, may be performed in one or more permutations, combinations, orders, or repetitions, according to particular needs.

At activity 302, monitoring module 202 of cart viewing system 110 detects a request to share cart data 220 between devices. Monitoring module 202 may use various artificial intelligence (AI) or machine learning (ML) text classification techniques, such as SVM or naïve Bayes, to analyze text communications between a primary and a non-primary device. According to embodiments, monitoring module 202 may also use ML transcription models to convert non-text communications, such as phone conversations into text in order to perform text classification. Monitoring module 202 may determine from one or more communications that a user of the primary device has requested help with a cart from a customer service representative. In embodiments, the cart may be associated with an e-commerce website.

At activity 304, streaming module 204 of cart viewing system 110 retrieves cart data 220 from a device associated with a primary user based on a sharing method. The sharing method may be determined based on the type of display device in use on the primary device. For example, when the display device is an AR glass, and the non-primary device is also using an AR glass, streaming module 204 may determine the sharing method to be video streaming. In such a case, cart data 220 may be video data.

At activity 306, filtering module 206 of cart viewing system 110 filters private user data from cart data 220. For example, the user of the primary device may select certain portions of video data to censor from streaming. In other examples, filtering module 206 may determine which parts of video data not to stream based on a configuration of an application associated with the cart, such as, for example, streaming only a cart pane of a website screen, rather than the entire website screen.

At activity 308, streaming module 204 displays filtered cart data 220 on a device associated with a non-primary user. Streaming module 204 may transmit filtered cart data 220 to the non-primary device for display on the display screen on the non-primary device. In other examples, cart viewing system 110 may be located on the same physical computing device or within the same distributed computing system of the non-primary device. In such examples, streaming module 204 may open a screen-viewing application on the non-primary device to show filtered cart data 220.

At activity 310, cart update module 210 of cart viewing system 110 enables updating of the cart by the device associated with the non-primary user. Different commands may be detected by cart update module 210 depending on the method of input used by the non-primary device. For example, cart update module 210 may further analyze communications between the primary device and the non-primary device to detect commands to update the cart. In embodiments, cart update module 210 may detect speech commands from a user of the non-primary device, such as, for example, when the non-primary device is equipped with a microphone.

FIG. 4 illustrates second example method 400 for sharing cart data 220 between two devices, in accordance with an embodiment. Method 400 may be performed by a cart viewing system, such as cart viewing system 110 of FIG. 1. Method 400 proceeds by one or more activities, which although described in a particular order, may be performed in one or more permutations, combinations, orders, or repetitions, according to particular needs.

At activity 402, monitoring module 202 of cart viewing system 110 monitors a conversation between a customer associated with a user device and a CSR associated with a CSR device over one or more communication channels. As disclosed above, the one or more communication channels may include, but is not limited to, email, chat message, audio communication, and the like. At activity 404, monitoring module 202 detects that either the customer associated with the user device or the CSR associated with a CSR device has referred to a cart in the conversation. According to embodiments, monitoring module 202 uses text classification techniques, such as SVM, to detect that the cart has been referred to. At activity 406, monitoring module 202 then determines that the user with current cart access is a primary user and the other user is a non-primary user. Monitoring module 202 further detects the need of the primary user to share the cart with the non-primary user based on the communications between the primary user and the non-primary user at activity 408 by using text classification techniques.

At activity 410, streaming module 204 of cart viewing system 110 determines a medium through which the cart may be shared with the non-primary user. In some embodiments, the medium may be via any device which enables passing this streaming view. In other embodiments, the medium may be a device on which the customer and the CSR are already working on. For example, when both the customer and the CSR are working on laptop devices, streaming module 204 may determine to share the cart by giving the non-primary user a temporary credential to access an application of the primary device. Thus, method 400 may proceed by way of two paths. Namely, at activity 412, credentials module 208 of cart viewing system 110 may generate a temporary credential to enable temporary access to the primary device access and send the temporary credential to the non-primary user, or at activity 414, streaming module 204 may initiate the process of streaming the view of the primary to the non-primary user.

At activity 416, filtering module 206 of cart viewing system 110 filters out sensitive or private customer information to improve user privacy security. In some embodiments, the primary user may use control to select which parts of the primary device screen to capture or stream. In other embodiments, cart viewing system 110 may be configured to recognize which parts of an application running on the primary device contain private data and which parts do not. In such embodiments, streaming module 204 may stream only the parts of the application that do not contain private data.

Method 400 continues to activity 418 with the non-primary user viewing the cart either via streaming or using the temporary credential. At activity 420, cart update module 210 of cart viewing system 110 enables the non-primary user to update the cart by text, voice, or by operating directly on the cart. As disclosed above, cart update module 210 may use text classification techniques, such as Naïve Bayes, to detect commands to update the cart. At activity 422, cart update module 210 transfers the cart from the primary user to the non-primary user, when necessary. At activity 424, monitoring module 202 detects that the communication between the primary user and the non-primary user has ended, and monitoring module 202 stops the streaming of cart data 220 when cart data 220 is shared via streaming or purges the temporary credential when cart data 220 is shared via providing the temporary credential.

Figure 5:
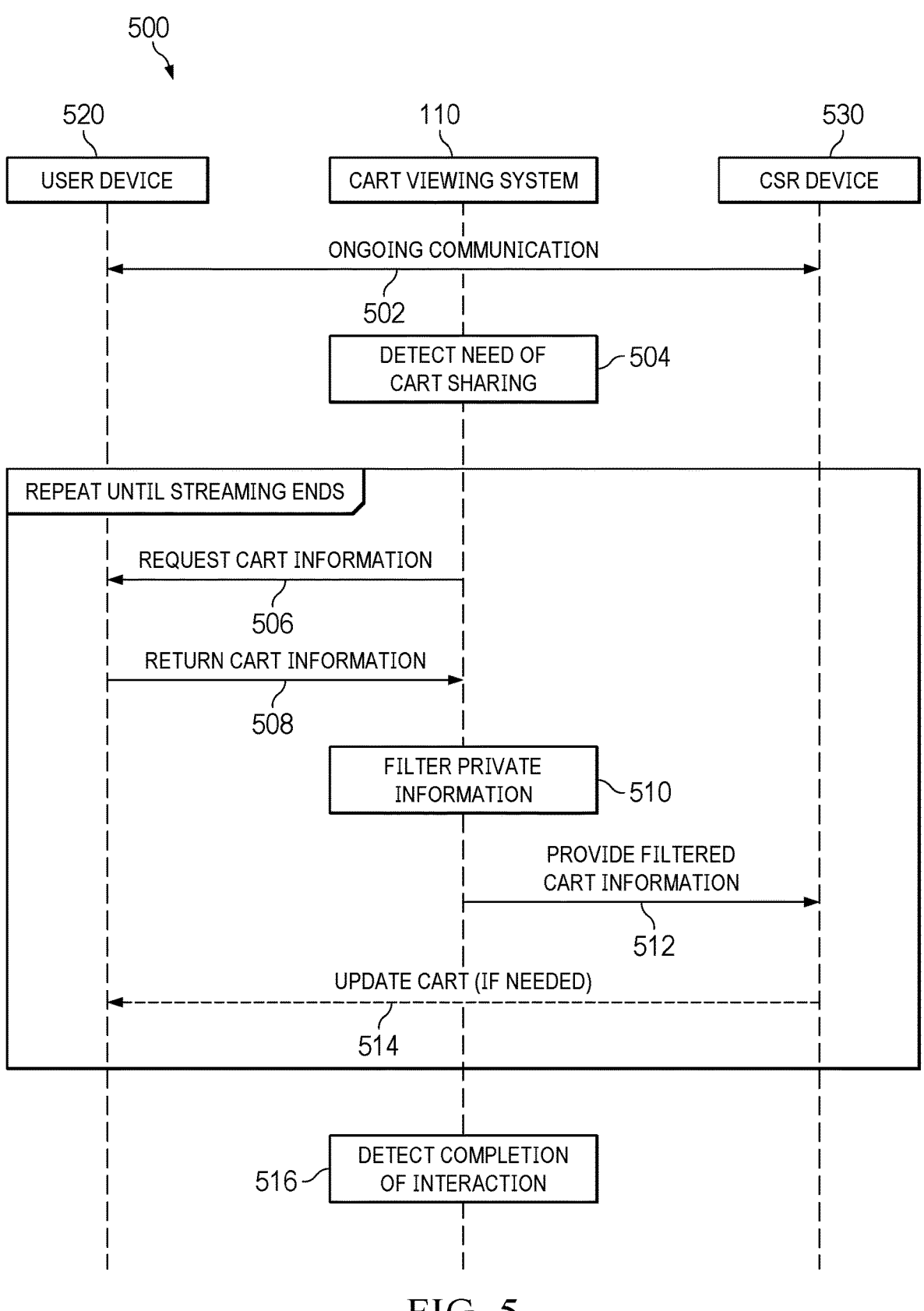
FIG. 5 illustrates a sequence diagram of a method for sharing cart data between a user device and a CSR device, in accordance with an embodiment.

FIG. 5 illustrates sequence diagram of method 500 for sharing cart data between a user device and a CSR device, in accordance with an embodiment. Method 500 may be performed by a cart viewing system, such as cart viewing system 110 of FIG. 1. Method 500 proceeds by one or more activities, which although described in a particular order, may be performed in one or more permutations, combinations, orders, or repetitions, according to particular needs. In this embodiment, cart viewing system 110 interfaces with user device 520 and CSR device 530. According to embodiments, cart viewing system 110 may be located on the same physical computing device or within the same distributed computing network as CSR device 530.

At activity 502, monitoring module 202 of cart viewing system 110 begins monitoring communications between user device 520 and CSR device 530. The communications may, for example, be initiated by a user or customer associated with user device 520 to seek help with a cart screen of an e-commerce website associated with CSR device 530. According to embodiments, monitoring module 202 monitors communications between user device 520 and CSR device 530 to detect cart sharing intents between user device 520 and CSR device 530. At activity 504, monitoring module 202 detects a request for cart sharing between user device 520 and CSR device 530. As discussed in further detail above, monitoring module 202 may utilize one or more text classification techniques to detect the need of cart sharing.

Within an iterative loop, at activity 506, streaming module 204 of cart viewing system 110 requests cart data 220 from user device 520. At activity 508, user device 520 returns cart data 220. In embodiments, cart data 220 may be video data showing the current display screen of user device 220. For example, when user device 220 is displaying the e-commerce website cart, cart data 220 may include video data capturing the display of the e-commerce website.

At activity 510, filtering module 206 of cart viewing system 110 filters private information of a user associated with user device 520 from cart data 220. For example, the user associated with user device 520 may select portions of the display of the user device to stream to CSR device 530. At activity 512, cart viewing system 110 provides the filtered cart information to CSR device 530. When cart data 220 includes video data, streaming module 204 may open an application or window on CSR device 530 to play the video data on a display of CSR device 530.

At activity 514, cart update module 210 of cart viewing system 110 updates the cart from CSR device 530 to user device 520. Cart update module 210 may further monitor communications between user device 520 and CSR device 530 to determine whether a grant of permission from user device 520 has been communicated. When the grant of permission has been communicated, cart update module 210 may enable a user of CSR device 530 to manipulate the cart, using an input device of CSR device 530, such as, for example, a mouse, a keyboard, or a microphone, according to embodiments. Activity 514 is the final activity of the iterative loop, which repeats from activity 506 until the streaming of cart data 220 ends.

At activity 516, monitoring module 202 detects completion of the interaction between user device 520 and CSR device 530 and ends the sharing of cart data 220. For example, monitoring module 202 may detect in the communications that one or both users have stated that cart sharing should end. In other examples, monitoring module 202 may detect that communication between the users has ended, such as, for example, a phone call ending or a chat window being closed, and stops cart sharing in response.

In one example, user device 520 is an AR glass. The customer associated with user device 520 starts a chat message communication chain with a CSR associated with CSR device 530, and monitoring module 202 of cart viewing system 110 begins monitoring the ongoing communications at activity 502. During the conversation, the CSR asks the customer whether it would be acceptable to share a current cart view with the CSR, which monitoring module 202 detects at activity 504. Accordingly, streaming module 204 of cart viewing system 110 captures the cart view that the customer has displayed on user device 520 at activity 506 and activity 508, and shares the cart view with the CSR on a call center application screen executing on CSR device 530 at activity 512. While sharing the cart view, filtering module 206 of cart viewing system 110 filters out all components that are not related to the cart at activity 510. For example, filtering module 206 does not show recently viewed products and account details to the CSR.

Cart update module 210 of cart viewing system 110 detects that the CSR, via text in the communications, has agreed the prices to be adjusted by ten percent after performing the required validations on CSR device 530. Cart update module 210 enables CSR device 530 to adjust the cart to have the ten percent lower price at activity 514, and the customer is satisfied with the result of the communication. As such, the communications are terminated, which monitoring module 202 detects at activity 516, and streaming ends. In this example, the communication between the customer and the CSR is resolved quickly through chat communications, and the CSR does not search for the cart or navigate to the details of the customer.

In addition, or as an alternative, when the customer agrees to share his cart view with a CSR after being prompt by monitoring module 202, credentials module 208 of cart viewing system 110 generates a URL along with temporary credentials that enable the CSR to view the cart that is displayed on user device 520 in an e-Commerce website, in read-only mode, on a call center application of CSR device 530. Cart update module 210 detects that the CSR has agreed to the prices being adjusted by ten percent after performing the required validations on the CSR device and adjusts the cart to have a ten percent lower price.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method for sharing cart data, comprising:
   detecting, using a computer comprising a processor and memory, a request to share cart data of a cart between a primary device and a non-primary device;
   determining, using the computer, from one or more communications that a user of the primary device has requested help with the cart from a customer service representative;
   retrieving, using the computer, the cart data from the primary device based at least in part on a sharing method;
   filtering, using the computer, private user data from the cart data, wherein the filtered private user data comprises portions of video data;
   displaying, using the computer, the filtered cart data on the non-primary device, wherein the non-primary device is associated with the customer service representative; and
   updating, using the computer, the cart data based at least in part on one or more communications between the primary device and the non-primary device without transforming the cart to meet one or more specifications of different channels of an e-commerce channel and a customer service platform.

2. The method of claim 1, wherein the sharing method is determined based on a type of display in use on the primary device.

3. The method of claim 1, wherein the filtering further comprises selecting certain portions of video data to censor from streaming.

4. The method of claim 1, further comprising:
   monitoring, by the computer, non-text communications between the primary device and the non-primary device; and
   converting, by the computer, the non-text communications into text in order to perform text classification.

5. The method of claim 1, further comprising:
   transmitting, by the computer, a temporary URL to the non-primary device for access to the cart data.

6. The method of claim 1, further comprising:
   generating, by the computer, temporary access credentials to allow access to the cart data by the non-primary device.

7. The method of claim 6, further comprising:
   purging, by the computer, the temporary access credentials upon ending sharing of the cart data.

8. A system for sharing cart data, comprising:
   a computer comprising a processor and a memory and configured to:
      detect a request to share cart data of a cart between a primary device and a non-primary device;
      determine from one or more communications that a user of the primary device has requested help with the cart from a customer service representative;
      retrieve the cart data from the primary device based at least in part on a sharing method;
      filter private user data from the cart data, wherein the filtered private user data comprises portions of video data;
      display the filtered cart data on the non-primary device, wherein the non-primary device is associated with the customer service representative; and update the cart data based at least in part on one or more communications between the primary device and the non-primary device without transforming the cart to meet the specifications of different channels of an e-commerce channel and a customer service platform.

9. The system of claim 8, wherein the sharing method is determined based on a type of display in use on the primary device.

10. The system of claim 8, wherein the filtering further comprises selecting certain portions of video data to censor from streaming.

11. The system of claim 8, wherein the computer is further configured to:

monitor non-text communications between the primary device and the non-primary device; and convert the non-text communications into text in order to perform text classification.

12. The system of claim 8, wherein the computer is further configured to:

transmit a temporary URL to the non-primary device for access to the cart data.

13. The system of claim 8, wherein the computer is further configured to:

generate temporary access credentials to allow access to the cart data by the non-primary device.

14. The system of claim 13, wherein the computer is further configured to:

purge the temporary access credentials upon ending sharing of the cart data.

15. A non-transitory computer-readable medium embodied with software, the software when executed is configured for sharing cart data by:

detecting a request to share cart data of a cart between a primary device and a non-primary device;

determining from one or more communications that a user of the primary device has requested help with the cart from a customer service representative;

retrieving the cart data from the primary device based at least in part on a sharing method;

filtering private user data from the cart data, wherein the filtered private user data comprises portions of video data;

displaying the filtered cart data on the non-primary device, wherein the non-primary device is associated with the customer service representative; and updating the cart data based at least in part on one or more communications between the primary device and the non-primary device without transforming the cart to meet one or more specifications of different channels of an e-commerce channel and a customer service platform.

16. The non-transitory computer-readable medium of claim 15, wherein the sharing method is determined based on a type of display in use on the primary device.

17. The non-transitory computer-readable medium of claim 15, wherein the filtering further comprises selecting certain portions of video data to censor from streaming.

18. The non-transitory computer-readable medium of claim 15, wherein the software is further configured for sharing cart data by:

monitoring non-text communications between the primary device and the non-primary device; and converting the non-text communications into text in order to perform text classification.

19. The non-transitory computer-readable medium of claim 15, wherein the software is further configured for sharing cart data by:

transmitting a temporary URL to the non-primary device for access to the cart data.

20. The non-transitory computer-readable medium of claim 15, wherein the software is further configured for sharing cart data by:

generating temporary access credentials to allow access to the cart data by the non-primary device; and purging the temporary access credentials upon ending sharing of the cart data.

* * * * *